(12) United States Patent
Ruettinger et al.

(10) Patent No.: US 11,219,882 B2
(45) Date of Patent: Jan. 11, 2022

(54) CATALYST DEVICE FOR TREATMENT OF FORMALDEHYDE AND VOLATILE ORGANIC COMPOUNDS

(71) Applicant: BASF CORPORATION, Florham Park, NJ (US)

(72) Inventors: Wolfgang Ruettinger, East Windsor, NJ (US); Laif Alden, Feasterville, PA (US); Pascaline Tran, Holmdel, NJ (US); David Weinberger, Philadelphia, PA (US); AnJu Shi, Shanghai (CN); Feng Zhao, Shanghai (CN)

(73) Assignee: BASF CORPORATION, Florham Park, NJ (US)

( * ) Notice: Subject to any disclaimer, the term of this patent is extended or adjusted under 35 U.S.C. 154(b) by 151 days.

(21) Appl. No.: 15/778,068

(22) PCT Filed: Nov. 21, 2016

(86) PCT No.: PCT/US2016/063040
§ 371 (c)(1),
(2) Date: May 22, 2018

(87) PCT Pub. No.: WO2017/105785
PCT Pub. Date: Jun. 22, 2017

(65) Prior Publication Data
US 2018/0333699 A1    Nov. 22, 2018

Related U.S. Application Data

(60) Provisional application No. 62/269,216, filed on Dec. 18, 2015.

(51) Int. Cl.
*B01J 23/34*    (2006.01)
*B01J 23/00*    (2006.01)
(Continued)

(52) U.S. Cl.
CPC .......... *B01J 23/34* (2013.01); *B01D 53/8668* (2013.01); *B01D 53/885* (2013.01); *B01J 23/002* (2013.01);
(Continued)

(58) Field of Classification Search
CPC ........ B01J 23/34; B01J 23/002; B01J 35/026; B01J 35/04; B01J 37/0009; B01J 37/0219;
(Continued)

(56) References Cited

U.S. PATENT DOCUMENTS 4,541,996 A    9/1985  Pereira et al.
6,492,298 B1   12/2002 Sobukawa et al.
(Continued)

FOREIGN PATENT DOCUMENTS

WO    2011105728       9/2011
WO    WO-2015111079 A1 *  7/2015  ............ B01J 37/009

OTHER PUBLICATIONS

Notification of Transmittal of the International Search Report and the Written Opinion of the International Searching Authority for PCT/US2016/63040 dated Apr. 4, 2017, 15 pages.
(Continued)

*Primary Examiner* — Anita Nassiri-Motlagh
(74) *Attorney, Agent, or Firm* — Lowenstein Sandler LLP

(57) ABSTRACT

Disclosed herein are catalyst devices for removing formaldehyde, volatile organic compounds, and other pollutants from an air flow stream. A catalyst device includes a housing, a solid substrate disposed within the housing, and a catalyst layer disposed on the substrate. The catalyst layer includes a base metal catalyst at a first mass percent and a rare earth metal catalyst at a second mass percent.

12 Claims, 8 Drawing Sheets

(51) Int. Cl.
*B01D 53/88* (2006.01)
*B01J 37/00* (2006.01)
*B01J 35/02* (2006.01)
*B01J 37/04* (2006.01)
*B01J 35/00* (2006.01)
*B01J 37/08* (2006.01)
*B01D 53/86* (2006.01)
*B01J 35/04* (2006.01)
*B01J 37/02* (2006.01)

(52) U.S. Cl.
CPC ............ *B01J 35/026* (2013.01); *B01J 35/04* (2013.01); *B01J 37/0009* (2013.01); *B01J 37/0219* (2013.01); *B01J 37/04* (2013.01); *B01J 37/08* (2013.01); *B01D 2255/2022* (2013.01); *B01D 2255/2065* (2013.01); *B01D 2255/2073* (2013.01); *B01D 2255/40* (2013.01); *B01D 2257/106* (2013.01); *B01D 2257/2064* (2013.01); *B01D 2257/30* (2013.01); *B01D 2257/306* (2013.01); *B01D 2257/402* (2013.01); *B01D 2257/502* (2013.01); *B01D 2257/708* (2013.01); *B01D 2258/06* (2013.01); *B01J 35/00* (2013.01); *B01J 2523/00* (2013.01); *Y02A 50/20* (2018.01); *Y02C 20/10* (2013.01)

(58) Field of Classification Search
CPC ....... B01J 37/04; B01J 37/08; B01D 53/8668; B01D 53/885
USPC ..................................................... 423/245.1
See application file for complete search history.

(56) References Cited

U.S. PATENT DOCUMENTS

| | | |
|---|---|---|
| 2001/0031693 A1 | 10/2001 | Hoke et al. |
| 2007/0003800 A1 | 1/2007 | Dallas et al. |
| 2007/0060472 A1 | 3/2007 | Fisher et al. |
| 2014/0255283 A1 | 9/2014 | Sidheswaran et al. |
| 2014/0255284 A1 | 9/2014 | Alden et al. |
| 2015/0057149 A1 | 2/2015 | Yang et al. |

OTHER PUBLICATIONS

Zhou, L. et al., "Control over the morphology and structure of manganese oxide by tuning reaction conditions and catalytic performance for formaldehyde oxidation", Materials Research Bulletin 46, 2011, pp. 1714-1722.

* cited by examiner

CATALYST DEVICE FOR TREATMENT OF FORMALDEHYDE AND VOLATILE ORGANIC COMPOUNDS

CROSS-REFERENCE TO RELATED APPLICATION(S)

This application is a national phase of International Application No. PCT/US2016/063040, filed on Nov. 21, 2016, which claims the benefit of U.S. Provisional Patent Application No. 62/269,216, filed on Dec. 18, 2015. The contents of these applications are hereby incorporated by reference in their entirety.

TECHNICAL FIELD

The present disclosure relates to devices and methods that utilize catalysts for air purification. More particularly, the disclosure relates to a catalyst device for removing formaldehyde and volatile organic compounds from air supplies.

BACKGROUND

Atmospheric pollution is a concern of increasing importance as the levels of various atmospheric pollutants continue to increase. One primary pollutant of concern is formaldehyde (HCOH). It is regarded as a major indoor pollutant emitted from widely used building and decorative materials. Long term exposure to formaldehyde is considered to be carcinogenic.

Several cities in China, including Shanghai, Hangzhou, Suzhou, Nanjing, Wuhan, Chongqing, and Chengdu, were inspected in 2011 by the Indoor Environment and the Health Branch of China Environmental Science Institute with respect to the formaldehyde concentration present therein. Although the national standard sets a formaldehyde concentration limit of 0.1 mg/m$^3$, each of the cities inspected had a formaldehyde concentration level significantly higher than the national limit. The levels ranged from 15% to 40% higher than the national standard.

Among the market solutions currently available to control formaldehyde pollution is the use of active carbon, possibly in combination with potassium permanganate as a stoichiometric oxidant. However, these methods have become impractical since active carbon could potentially release the formaldehyde through desorption, or the capacity of the solution to remove formaldehyde is too low.

Catalytic oxidation is another technology currently used in the market for controlling formaldehyde pollution. Complete catalytic oxidation of hundreds of parts-per-million (ppm) of formaldehyde has only been achieved with noble metal supported catalysts. However, the high costs and lack of availability of noble metals limit their widespread application.

There continues to be a need for systems, methods, and compositions for effectively treating pollution from formaldehyde and other volatile organic compounds (VOCs). These methods and compositions should exhibit long term performance, efficient manufacturing operations, and reduced production costs.

SUMMARY

Disclosed herein are methods, devices, and systems for purifying an air supply of formaldehyde and volatile organic compounds. Also disclosed herein are methods for producing catalyst devices.

In some embodiments, a catalyst device includes a housing and a catalyst disposed on the substrate. The catalyst includes a base metal catalyst at a first mass percent and a rare earth metal catalyst at a second mass percent.

In one embodiment of the device, the catalyst is to remove one or more of formaldehyde, ozone, carbon monoxide, nitrous oxide, amines, sulfur compounds, thiols, chlorinated hydrocarbons, or volatile organic compounds from an unpurified air supply.

In some embodiments, the catalyst may be a particle or a plurality of particles. In some embodiments, the catalytic particles may be mixed and dispersed on the solid substrate along with other adsorbents or catalysts, such as activated carbon.

In some embodiments, the catalyst device includes a housing, a solid substrate within the housing, and a catalyst comprising a plurality of catalytic particles dispersed on the solid substrate.

A particle or plurality of particles may have various mechanical properties such as various sizes, surface area, and shapes including but not limited to pellets, beads, extrudates, rings, spheres, cylinders, trilobe, and quadralobe shaped pieces.

In one embodiment of the device, the base metal catalyst comprises cryptomelane potassium manganese oxide (CPMO) and the rare earth metal catalyst comprises cerium oxide. For example, the base metal catalyst may be CPMO at a first mass percent between about 30% and about 99%, between about 50% and about 99%, between about 70% and 99%, between about 80% and 99%, about 80%, about 52%, or about 50%. As another example, the rare earth metal catalyst may be cerium oxide at a second mass percent between about 1% and about 70%, between about 1% and about 50%, between about 1% and 30%, between about 1% and 20%, about 20%, about 48%, or about 50%.

In one embodiment of the device, the solid substrate is a nonwoven filter, a paper filter, a ceramic filter, or a fibrous filter. In another embodiment of the device, the solid substrate is a metallic foam substrate, a ceramic foam substrate, or a polymer foam substrate. In yet another embodiment of the device, the solid substrate is a metallic monolithic substrate, a ceramic monolithic substrate, a paper monolithic substrate, a plastic substrate, a polymeric monolithic substrate, or a ceramic fiber monolithic substrate. In yet another embodiment of the device, the solid substrate is an HVAC duct, an air filter, or a louver surface.

In one embodiment of the device, the catalyst device further includes an inlet port configured to receive unpurified air into the interior of the housing, and an outlet port configured to deliver purified air from the housing. The catalyst device may be configured to contact the received unpurified air with the catalyst layer, in which formaldehyde present in the received unpurified air is converted to carbon dioxide and water upon contact with the catalyst layer. The received unpurified air may have an initial formaldehyde content, and the purified air may have a final formaldehyde content that is less than the initial formaldehyde content. For example, the final formaldehyde content of the purified air may be less than about 50% of the initial formaldehyde content of the received unpurified air, or less than about 30% of the initial formaldehyde content of the received purified air.

In one embodiment of the device, the catalyst device is incorporated into a heating, ventilation, and air conditioning (HVAC) system of a building.

In one embodiment of the device, the catalyst device is incorporated into a portable air purifier.

In one embodiment, a method for purifying an air flow stream includes contacting an unpurified air flow stream with a catalyst layer or with a catalyst particle or plurality of particles to produce a purified air flow stream. The unpurified air flow stream contains a first formaldehyde content, and the purified air flow stream contains a second formaldehyde content that is less than the first formaldehyde content. The catalyst layer or catalyst particles include a base metal catalyst and a rare earth metal catalyst.

In some embodiments of the method, the catalytic particles are within a housing absent a substrate. In other embodiments, the catalyst layer is disposed on a solid substrate. The solid substrate may be a part of an HVAC system. In one embodiment of the method, the solid substrate is a nonwoven filter, a paper filter, a ceramic filter, or a fibrous filter. In another embodiment of the method, the solid substrate is a metallic foam substrate, a ceramic foam substrate, or a polymer foam substrate. In yet another embodiment of the method, the solid substrate is a metallic monolithic substrate, a ceramic monolithic substrate, a paper monolithic substrate, a polymeric monolithic substrate, or a ceramic fiber monolithic substrate. In yet another embodiment of the method, the solid substrate is an HVAC duct, an air filter, or a louver surface.

In one embodiment of the method, contacting the unpurified air flow stream with the catalyst layer or with the plurality of catalyst particles removes at least one of carbon monoxide, nitrous oxide, or a volatile organic compound from the unpurified air flow stream to produce the purified air flow stream.

In one embodiment of the method, the catalyst layer or catalyst particle(s) comprise a CPMO metal catalyst and a rare earth metal catalyst, such as cerium oxide. For example, the catalyst layer is CPMO at a first mass percent of between about 30% and about 99%, between about 50% and about 99%, between about 70% and 99%, between about 80% and 99%, about 80%, about 52%, or about 50%. The rare earth metal catalyst may be cerium oxide at a second mass percent between about 1% and about 70%, between about 1% and about 50%, between about 1% and 30%, between about 1% and 20%, about 20%, about 48%, or about 50%.

In one embodiment of the method, the second formaldehyde content of the purified air flow stream may be less than about 50% of the first formaldehyde content of the unpurified air flow stream, or may be less than about 30% of the first formaldehyde content of the received purified air flow stream.

In one embodiment of the method, the unpurified air flow stream may be air flowing into a portable air purifier.

In one embodiment of the method, the second formaldehyde content of the purified air flow stream after three hours of contacting the unpurified air flow stream with the catalyst layer or with the plurality of catalytic particles is reduced by less than about 10% from the second formaldehyde content in the purified air stream immediately after contacting the unpurified air flow stream with the catalyst layer or with the plurality of catalytic particles begins. In some embodiments, the contacting occurs at a temperature ranging from about 20° C. to about 150° C. or at about 35° C. In some embodiments, the contacting occurs at a relative humidity ranging from about 0% to about 90%, or from about 10% to about 80%, or from about 20% to about 60%, at a temperature of about 20° C. In other embodiments, the contacting occurs at an absolute humidity of about 1%. In some embodiments the unpurified air flow stream contains about 2 ppm of formaldehyde. In some embodiments, the Volume Hourly Space Velocity (VHSV) of the flow stream is between 100 $h^{-1}$ and 1,000,000 $h^{-1}$, or between 50,000 $h^{-1}$ and 300,000 $h^{-1}$.

In one embodiment, a base metal catalyst composition includes cryptomelane potassium manganese oxide at a first mass percent and a rare earth metal at a second mass percent. In some embodiments the rare earth metal is cerium oxide. In some embodiments, the first mass percent is from about 30% to about 99%, is from about 50% to about 99%, from about 70% to 99%, between about 80% and 99%, about 80%, about 52%, or about 50%. The rare earth metal catalyst may be cerium oxide at a second mass percent is from about 1% to about 70%, from about 1% to about 50%, from about 1% to 30%, between about 1% and about 20%, about 20%, about 48% or about 50%.

In one embodiment, an environmental control system includes a housing having a catalyst layer disposed therein. The system also includes an inlet to receive unpurified air into the housing. The system also includes an outlet to deliver formaldehyde-reduced air from the housing, wherein the formaldehyde-reduced air is produced as a result of contact between the received unpurified air and the base metal catalyst.

In one embodiment, a method for producing a catalyst device includes providing a slurry, in which the slurry includes a base metal catalyst, a rare earth metal catalyst, a support material, and a binder material. The method further includes depositing the slurry onto a surface of a solid substrate, and calcining the deposited slurry to produce a catalyst layer disposed on the surface of the solid substrate. The solid substrate is placed into an air purification chamber, in which the solid substrate is arranged such that when an air flow is introduced into the air purification chamber, the catalyst layer contacts the air flow and converts formaldehyde in the air flow into carbon dioxide and water.

The terms "stream" or "flow" broadly refer to any flowing gas that may contain solids (e.g., particulates), liquids (e.g., vapor), and/or gaseous mixtures.

The terms "unpurified air" or "unpurified air stream" refers to any stream that contains one or more pollutants at a concentration or content at or above a level that is perceived as nuisance or is considered to have adverse effects on human health (including short term and/or long term effects). For example, in some embodiments, a stream that contains formaldehyde at a concentration greater than 0.5 part formaldehyde per million parts of air stream calculated as an eight hour time weighted average concentration pursuant to "action level" standards set forth by the Occupational Safety & Health Administration is an unpurified air stream. In some embodiments, a stream that contains formaldehyde at a concentration greater than 0.08 part formaldehyde per million parts of air stream calculated as an eight hour time weighted average concentration pursuant to national standards in China is an unpurified air stream. Unpurified air may include, but is not limited to, formaldehyde, ozone, carbon monoxide (CO), volatile organic compounds (VOCs), methyl bromide, water, and nitrogen.

The term "VOCs" refers to organic chemical molecules having an elevated vapor pressure at room temperature. Such chemical molecules have a low boiling point and a large number of the molecules evaporate and/or sublime at room temperature, thereby transitioning from a liquid or solid phase to a gas phase. Common VOCs are, but are not limited to, benzene, toluene, xylene, ethylbenzene, styrene, propane, hexane, cyclohexane, limonene, pinene, acetaldehyde, hexaldehyde, ethyl acetate, butanol, and the like.

The terms "purified air" or "purified air stream" refer to any stream that contains one or more pollutants at a concentration or content below a level that is perceived as nuisance or is considered to have adverse effects on human health (e.g., effectively free of pollutants). For example, in some embodiments, a stream that contains formaldehyde at a concentration lower than 0.5 part formaldehyde per million parts of air stream calculated as an eight hour time weighted average concentration pursuant to "action level" standards set forth by the Occupational Safety & Health Administration is a purified air stream. In some embodiments, a stream that contains formaldehyde at a concentration lower than 0.08 part formaldehyde per million parts of air stream calculated as an eight hour time weighted average concentration pursuant to national standards in China is a purified air stream.

The term "substrate" refers to the monolithic material or a metal substrate onto which the catalyst is placed. In some embodiments, the substrate may be in the form of a solid surface having a washcoat containing a plurality of particles having catalytic species thereon. A washcoat may be formed by preparing a slurry containing a specified solids content (e.g., 30-50% by weight) of supports in a liquid vehicle, which is then coated onto a substrate and dried to provide a washcoat layer.

BRIEF DESCRIPTION OF THE DRAWINGS

The above and other features of the present disclosure, their nature, and various advantages will become more apparent upon consideration of the following detailed description, taken in conjunction with the accompanying drawings, in which.

DETAILED DESCRIPTION

The present disclosure relates to the use of catalyst devices for the conversion and removal of formaldehyde, ozone, hydrocarbons, carbon monoxide, and various VOCs into less harmful compounds such as oxygen, carbon dioxide and water vapor. In certain embodiments, a catalyst composition including a physical mixture of CPMO and cerium oxide metal catalysts is shown to remove formaldehyde and convert it to carbon dioxide and water at higher efficiencies than a catalyst composition including each of the components separately, such as a CPMO metal catalyst alone or a cerium oxide metal catalyst alone.

The flow of ambient air may be treated in accordance with the embodiments described herein. In certain aspects of the disclosure, the intended catalytic activity may be obtained with a single coat of catalytic material onto a substrate. In some embodiments the catalytic material maybe a catalytic layer. In some embodiments, the catalytic layer may comprise distinct catalyst particles. In some embodiments, the catalytic material may be a plurality of catalytic particles supplied as pellets, beads, extrudates, rings, spheres, cylinders, trilobe, and quadralobe shaped pieces. In other aspects of the disclosure, the catalytic activity may also be obtained by impregnating a support with the catalytic material followed by coating the impregnated support onto a substrate. In some embodiments, the disclosure is directed to removal of pollutants indoors. In one embodiment, the disclosure is directed to an HVAC system for treating an air supply in order to remove pollutants, such as formaldehyde and VOC, contained in ambient air.

The various embodiments are now described with reference to the following figures and examples. Before describing several exemplary embodiments, it is to be understood that the present disclosure is not limited to the details of construction or process steps set forth in the following description. Other embodiments may be practiced or carried out in various ways in accordance with the principles described.

Figure 1:
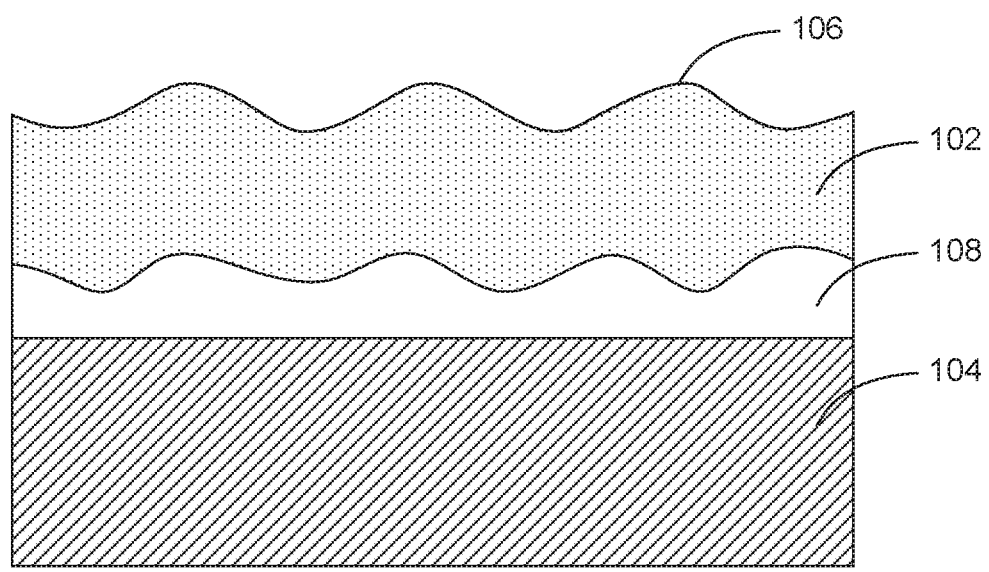
FIG. 1 depicts a cross sectional view of a catalyst layer deposited on a solid substrate in accordance with an embodiment of a catalyst device.

FIG. 1 depicts a cross sectional view of a catalyst layer deposited on a solid support in accordance with an embodiment. A catalyst 100 is formed by placing a catalyst layer 102 on a substrate 104, and may include an adhesive layer 108 that adheres the catalyst layer 102 to the substrate 104. The catalyst layer 102 may be porous and may have a high geometric surface area surface 106 that contacts an air flow. The high geometric surface area surface 106 facilitates turbulent air flow in the vicinity of the catalyst layer 102 such to increase the amount of exposure of pollutants within the air flow to the catalyst layer 102. The catalyst layer 102 and the adhesive layer 108 are not shown to scale.

In certain embodiments, the catalyst layer 102 is composed of a base metal catalyst and a rare earth metal catalyst. An exemplary catalyst for formaldehyde and/or VOC conversion includes about 50% CPMO ($K(Mn_7^{4+}Mn^{3+})O_{16}$) by mass based on total catalyst layer composition and about 50% cerium oxide ($CeO_2$), which is also known as ceria, by mass based on total catalyst layer composition.

In some embodiments catalyst layer 102 may comprise a plurality of catalyst particles, wherein the catalyst particles are composed of a base metal catalyst, such as CPMO, and a rare earth metal catalyst, such as ceria.

The catalyst layer or plurality of catalyst particles may be prepared, for example, by mixing a target amount of rare earth metal catalyst, such as ceria, and a target amount of base metal catalyst, such as CPMO, with a binder, such as boehmite alumina, to form a slurry. Afterwards adding a pH adjusting agent such as acetic acid, coating the slurry onto a substrate (e.g., the substrate 104), drying and calcining. A cellulose based thickener may be added to the slurry prior to coating. Calcining generates the final catalyst layer or plurality of catalyst particles, which contains about 40-98% CPMO, 2-50% ceria, and 0-10% binder based on total solids.

In some embodiments, a catalyst layer may include multiple layers or "sub-layers" of a catalyst material. Accordingly, it is to be understood that the term "catalyst layer", when referring to a catalyst material that includes different components, may refer to the components distributed within a single layer or the components separated into different layers. The components may be distinct catalyst particles formed by the physical mixture of a base metal catalyst, such as CPMO, and a rare earth metal catalyst, such as ceria. For example, a catalyst layer may include a first catalyst layer of a base metal catalyst (e.g., CPMO) and a second catalyst layer of a rare earth metal catalyst (e.g., ceria). The first layer may be disposed on the second layer, or the second layer may be disposed on the first layer. Alternatively, there could be a single or multiple catalyst layers, comprising all components, wherein each layer may have varying content of each component. In yet other embodiments, each catalyst layer may have the same content of each component.

In some embodiments, there may be an overlayer on the catalyst coating or an underlayer between the substrate and the catalyst layer 102. The underlayer or overlayer may be a protective coat, an adhesion layer (e.g., the adhesion layer 108), or an additional catalyst layer. In certain implementations, the catalyst layer 102 is adhered directly to the substrate 104 without the use of the adhesion layer 108.

The catalyst layer 102 may comprise a physical mixture of CPMO and ceria, for example, of between about 30% and about 99%, between about 50% and about 99%, between about 70% and 99%, between about 80% and 99%, about 80%, about 52%, or about 50% of CPMO and of between about 1% to about 70%, between about 1% to about 50%, between about 1% to 30%, between about 1% to 20%, about 20%, about 48%, or about 50% cerium oxide.

Catalyst layer 102 may comprise of crystallite CPMO and either crystallite or amorphous ceria.

The catalyst layer or plurality of catalytic particles may exhibit and x-ray diffraction pattern expressed in terms of °2θ and the intensity counts of the catalyst composition of inventive example 1. The °2θ peaks and intensities are listed in the following table:

| °2θ | Intensity (counts) |
|---|---|
| 13 | 24 |
| 18 | 20 |
| 28.5 | 45 |
| 33 | 20 |
| 37.5 | 17 |
| 42 | 12 |
| 47.5 | 25 |
| 50 | 12 |
| 56 | 20 |
| 59 | 13 |
| 65 | 10 |
| 70 | 12 |
| 76.5 | 13 |
| 79 | 12 |
| 88 | 12. |

In some embodiments, the substrate 104 may be a nonwoven filter, a paper filter, a ceramic filter, or a fibrous filter. In some embodiments, substrate 104 may be a metallic foam substrate, a ceramic foam substrate, or a polymer foam substrate. In some embodiments, substrate 104 may be a metallic monolithic substrate, a ceramic monolithic substrate, a paper monolithic substrate, a polymer monolithic substrate, or a ceramic fiber monolithic substrate. In some embodiments, substrate 104 may be an HVAC duct, an air filter, or a louver surface. In some embodiments substrate 104 may be absent.

In certain embodiments, the catalyst layer 102 may be in the form of particles. The particle size may be any suitable size. In one embodiment, the particles are smaller than the desired thickness of the coating. For example, the particles may have a mean size from about 1 micrometers to about 15 micrometers.

Figure 2:
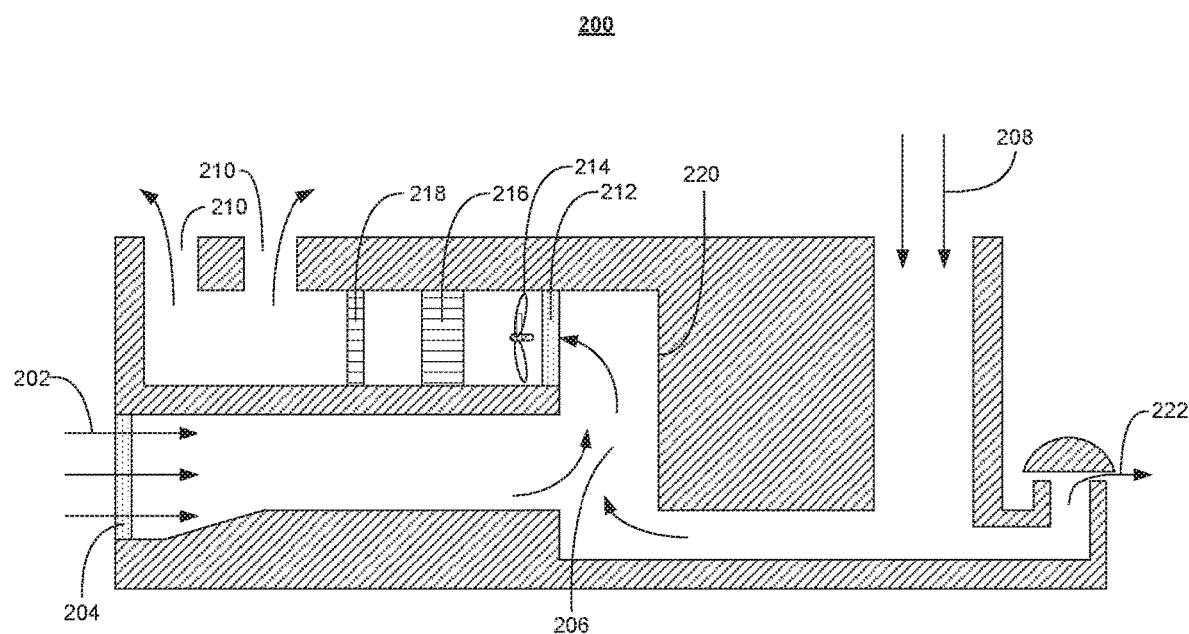
FIG. 2 depicts a heating, ventilation, and air-conditioning ("HVAC") system in accordance with an embodiment.

FIG. 2 depicts a heating, ventilation, and air-conditioning ("HVAC") system in accordance with an embodiment. HVAC system 200 may be, for example, located within the interior of a residential building, an office building, or any other closed structure for which ventilation is utilized. HVAC system 200 may be part of a house and may be partially located in a basement or crawl space of the house, with ducts arranged to provide ventilation to each room of the house.

Ambient air 202 enters HVAC system 200 through inlet filter 204. Inlet filter 204 may be an air filter to filter the air as it enters, or may be a screen used to prevent pests (e.g., insects and animals) from entering the HVAC system 200. One or more fans 214 may be utilized to produce a negative pressure within the HVAC system 200 that draws in ambient air 202. Recirculated air 208 from inside of the building also enters the HVAC system 200. The HVAC system 200 also includes a vent 222 to allow air to flow out of the HVAC system 200 in the case of overpressure.

The recirculated air 208 and ambient air 202 mix together in mixing chamber 206, which then passes through various HVAC components prior to entering the house through vents 210. Mixed air may first pass through a primary air filter 212. Air is forced through the primary air filter 212 by the fan 214, and then passes into a heating/cooling unit 216 that exchanges heat with the passing air. The heating/cooling unit 216 may be include power supplies and electrical connectivity to a thermostat located within the building. Additional components utilized by the heating/cooling unit 216 may include, for example, a humidifier and/or a drip pan for capturing and funneling out condensed water. The HVAC system 200 may also include an additional air filter 218 prior to delivering air through vents 210.

In some embodiments, the HVAC system 200, or the components thereof, may act as a catalyst device housing by including catalyst layers deposited on various surfaces throughout to convert or remove formaldehyde, VOCs, and other pollutants from the ambient air prior to ventilating the building. For example, catalyst layers may coat interior walls 220 of the mixing chamber 206, or any other walls within the HVAC system 200. In some embodiments, filters 204, 212, and 218 may include catalyst layers along their surfaces such that air may pass through while simultaneously contacting the catalyst layers. In some embodiments, the blades of fan 214 may be coated with a catalyst layer.

Figure 3:
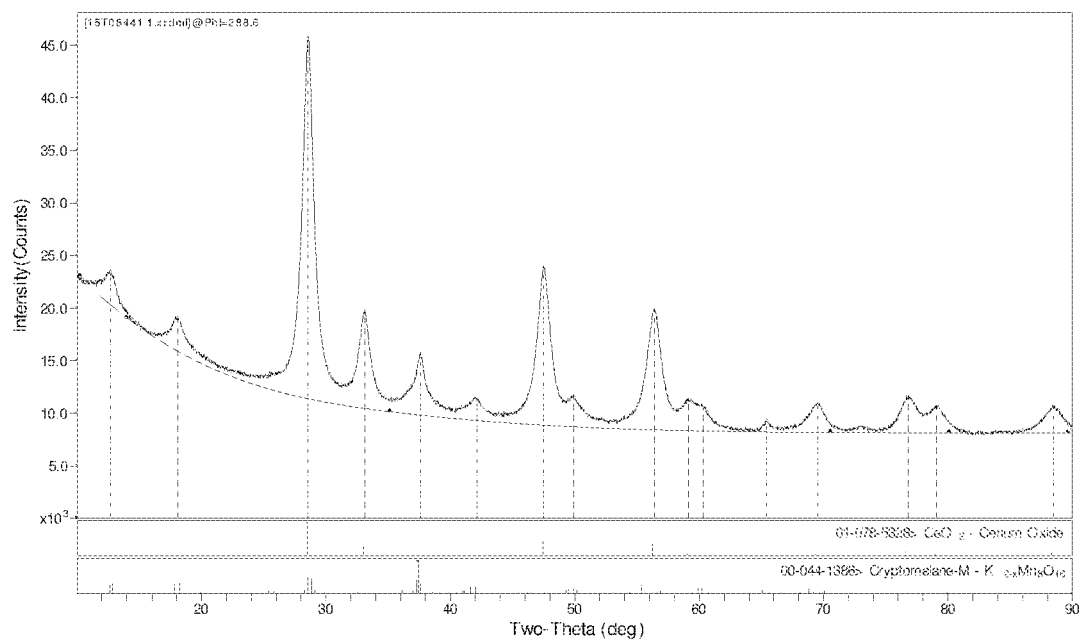
FIG. 3 depicts an x-ray diffraction pattern for inventive example 1.

FIG. 3 depicts an x-ray diffraction (XRD) pattern of the components of the catalyst layer according to an embodiment. The catalyst layer may comprise particles, wherein each particle comprises a base metal catalyst such as CPMO at a first mass percent and a rare earth metal such as cerium oxide at a second mass percent. A detailed discussion of the XRD pattern is included in example 1 below.

Cryptomelane (referred to herein as CPMO) is the mineral name of a porous manganese oxide. It is also referred to as manganese octahedral molecular sieve ($K_xMnO_2$). Cryptomelane has a one-dimensional tunnel structure composed of 2×2 edge shared $MnO_6$ octahedral chains, which are corner connected to form 4.6×4.6 Å tunnels. The manganese in the cryptomelane can be found in different valences, including $Mn^{2+}$, $Mn^{3+}$, $Mn^{4+}$, in the octahedral sites. Potassium ions are located in the tunnels with a small amount of water stabilizing the tunnel structure. Different cryptomelane morphologies exist, including micrometer long nanofibers, nanorods, nanoneedles, nanowires, paper-like materials, plate like particles, nanospheres, flower like nanostructures, lamellar platelets, and nanocrystals.

CPMO may be prepared in a variety of ways including but not limited to reflux, solid state chemical reactions, sol-gel and hydrothermal treatments.

It is believed that the catalysts efficacy is governed by a number of factors including: the catalyst's morphology, structure, specific surface area, degree of crystallinity, and reducibility.

Without being bound by theory, it is speculated that the pore channels of the CPMO are readily accessible, favoring the adsorption and diffusion of the pollutants and formaldehyde in particular. That was attributed to the effective tunnel diameter of CPMO (about 0.265 nm in size) being similar to the dynamic diameter of formaldehyde molecule. The compatible diameters between CPMO and formaldehyde allow the formaldehyde into the inner surface of the CPMO tunnel resulting in improved catalytic activity.

The interaction between physically mixed CPMO and ceria as illustrated herein improves the catalytic efficacy even further. The improved efficacy is seen particularly at lower temperatures ranging from about 10° C. to about 150° C., from about 15° C. to about 80° C., from about 20° C. to about 40° C., at about 21° C., at about 25° C., or at about 35° C.

Figure 4:
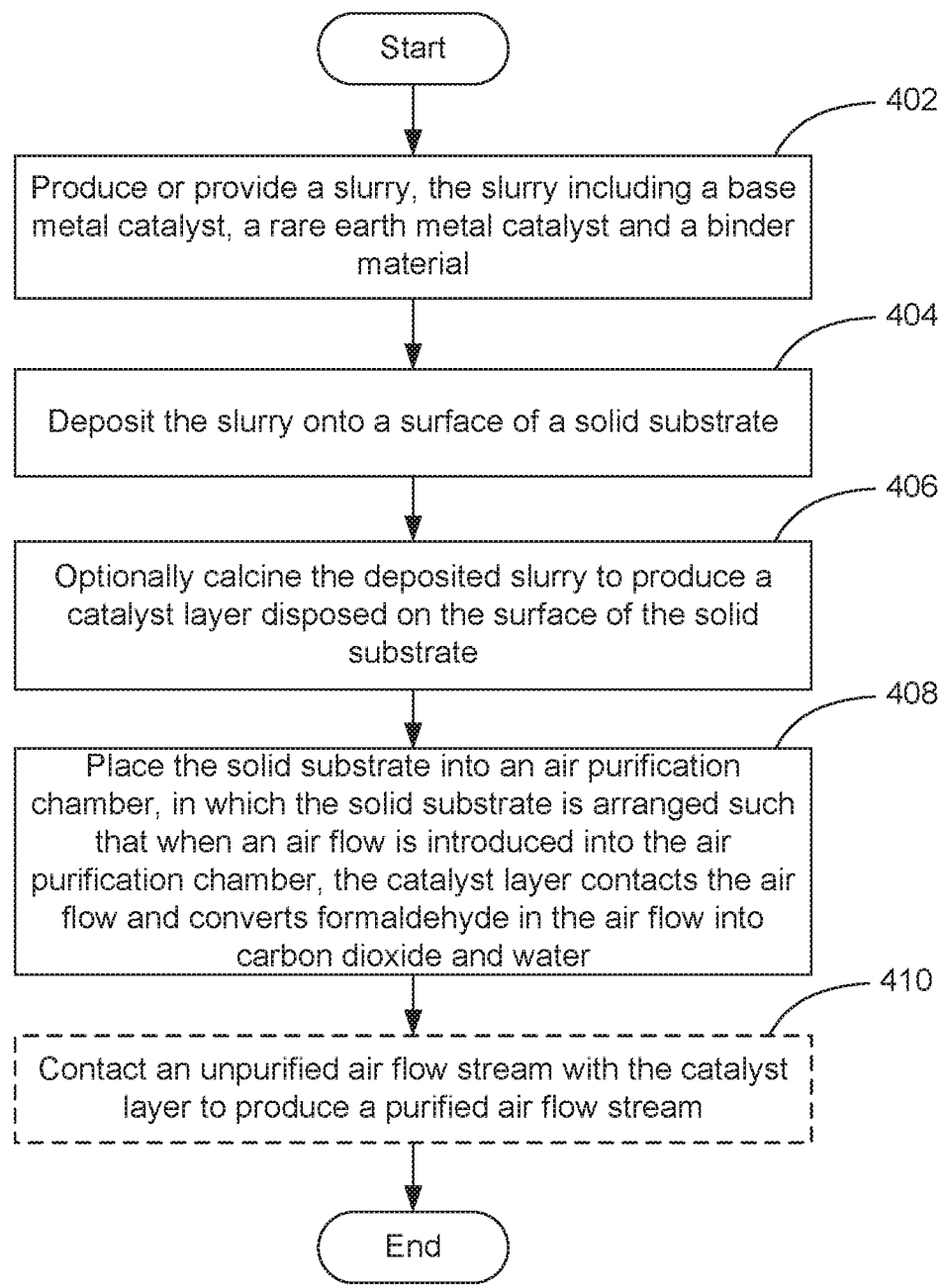
FIG. 4 depicts an illustrative process for producing a catalyst device in accordance with an embodiment.

FIG. 4 shows an illustrative process for producing a catalyst device in accordance with an embodiment. The process begins at block 402, where a slurry is produced or provided. The slurry includes a base metal catalyst, a rare earth metal catalyst, and a binder material.

In some embodiments, the catalytic layer or plurality of catalyst particles can also comprise of one or more materials that selected from ceria ($CeO_2$), praseodymia ($Pr_2O_3$), neodymia ($Nd_2O_3$), lanthana ($LaO_2$), yttria ($YtO_2$), titania ($TiO_2$), zirconia ($ZrO_2$), and combinations or composites (such as $CeZrO_2$ mixed oxides and $TiZrO_2$ mixed oxides) thereof. Thus, the oxygen donating support may include composite oxides or mixed oxides of two or more thereof.

The catalytic layer or plurality of catalyst particles may optionally further comprise additives. Additives may be selected from zirconium (Zr), lanthanum (La), yttrium (Yt), praseodymium (Pr), neodymium (Nd), ceria-alumina, and oxide thereof, a composite oxide or mixed oxide of any two or more thereof or at least one alkaline earth metal (e.g., barium (Ba)).

The resulting catalyst layer or catalytic particle(s) can then be mixed with a suitable binder. Subsequently, the catalyst may be dried and optionally calcined. Alternatively, the resulting catalyst may be calcined first, and then mixed with binder to make a suitable slurry for coating onto a substrate.

Examples of a suitable binder include alumina sol, boehmite, silica sol, titania sol, zirconium acetate, and colloidal ceria sol. A suitable binder may also be a polymer binder, including but not limited to, polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics, styrene acrylics, polyvinyl alcohols, thermoplastic polyesters, thermosetting polyesters, poly(phenylene oxide), poly (phenylene sulfide), fluorinated polymers such as poly(tetrafluoroethylene), polyvinylidene fluoride, poly (vinlyfluoride) and chloro/fluoro copolymers such as ethylene chlorotrifluoroethylene copolymer, polyamide, phenolic resins, polyurethane, acrylic/styrene acrylic copolymer latex and silicone polymers.

For a single-pot synthesis, the support, catalyst precursors, binder, and any inert materials (e.g., added to increase washcoat porosity) may be mixed together to form a slurry.

Returning to FIG. 4, at block 404 the slurry is deposited onto a surface of a solid substrate (e.g., substrate 104). The slurry may be, for example, sprayed onto the solid substrate, dip-coated onto the solid substrate, or directly deposited onto the solid substrate.

At block 406, the deposited slurry is optionally calcined to produce a catalyst layer (e.g., catalyst layer 102) disposed on the surface of the solid substrate. In some implementations, the coated slurry is dried at about 60-120° C. for about 2 hours and calcined at a temperature ranging from about 80° C. to about 800° C., from about 100° C. to about 600° C., from about 150° C. to about 300° C., about 200° C., or about 250° C.

In some embodiments, a substrate is pre-coated with the slurry containing that catalyst, support, binder and other inert materials. After drying and calcination, the coated substrate cores are dipped in a solution containing the base metal catalyst precursors. The completed cores are then dried and calcined at 250° C. to produce the final catalyst layer.

At block 408, the solid substrate is placed into an air purification chamber, such as any of the chambers described herein. The solid substrate is then arranged such that when an air flow is introduced into the air purification chamber, the catalyst layer contacts the air flow and converts formaldehyde in the air flow into carbon dioxide and water. In certain embodiments, other pollutants in the air flow may be converted into harmless or less harmful chemical species upon contact with the catalyst layer.

At block 410, an unpurified air flow stream is contacted with the catalyst layer to produce a purified air flow stream. Block 410 may be performed downstream, for example, by a user of the catalyst device, and not necessarily as part of the production process outlined in blocks 402, 404, 406, and 408.

It should be understood that the above steps of the flow diagrams of FIG. 4 may be executed or performed in any order or sequence not limited to the order and sequence shown and described. Also, some of the above steps of the flow diagrams of FIG. 4 may be executed or performed substantially simultaneously, where appropriate.

Figure 5:
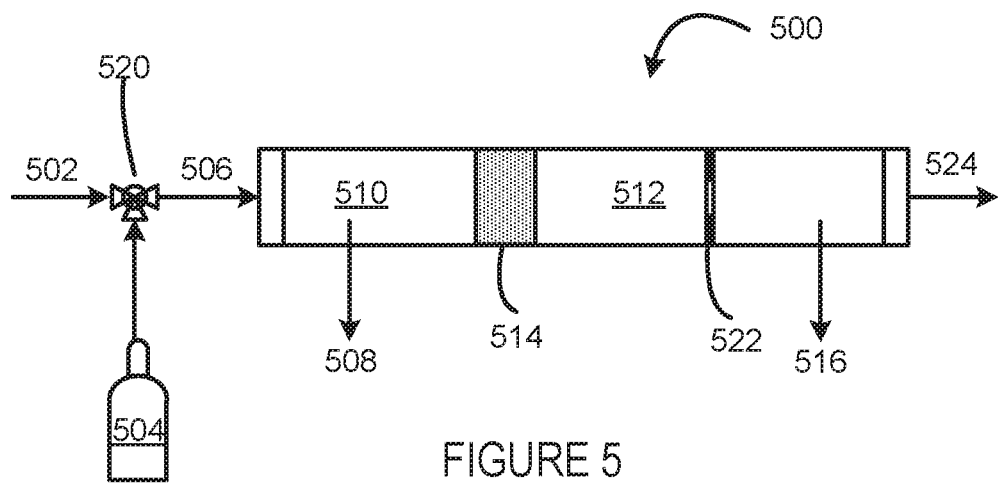
FIG. 5 depicts a one pass test schematic diagram for air purification in accordance with an embodiment.
Figure 6A:
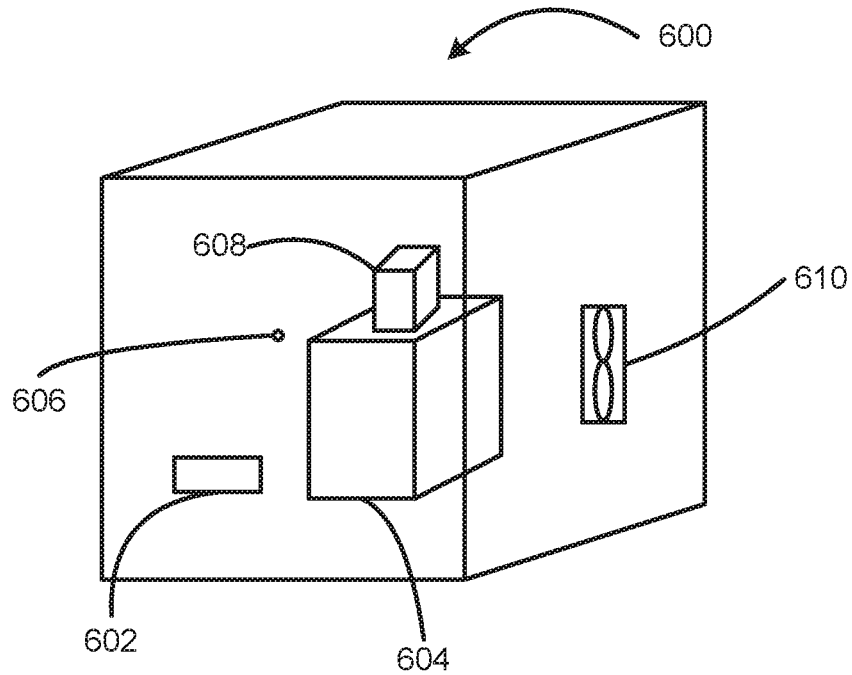
FIG. 6A depicts a system test schematic diagram for air purification in accordance with an embodiment.
Figure 6B:
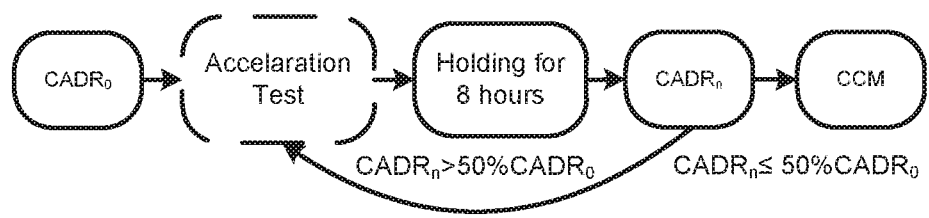
FIG. 6B depicts an illustrative control process for air purification in accordance with an embodiment disclosed herein.

FIGS. 5 and 6A-6B described in detail below are depictions of the one-pass test and system test set by the National Standards of the People's Republic of China and jointly issued by the General Administration of Quality Supervision, Inspection and Quarantine and the Standardization Administration of the People's Republic of China, also referred to as GB/T 18801 guidelines.

FIG. 5 depicts a schematic diagram for air purification in accordance with an embodiment. This schematic diagram illustrates a one-pass test set up configured to allow for quick sample screening and accelerated testing.

The testing device comprises an air duct system 500, a pollutant generator 504, a mixing valve 520, an upstream sampling tube 508, a downstream sampling tube 516, and an air cleaner 514. In the one-pass test ambient air 502 enters mixing valve 520 where it is mixed with pollutants (such as formaldehyde and VOCs) generated in pollutant generator 504. Resulting polluted air 506 exits mixing valve 520 and enters air duct system 500 where the efficacy of air cleaner 514 is tested.

Air duct system 500 may be bent or folded. In some embodiments, if air duct system 500 is bent, a straight duct segment of at least three times the duct diameter is laid before and after the bend to ensure stable air flow. A sample of polluted air 506 entering first air duct segment 510 of the air duct may be sampled through upstream sampling tube 508 to determine the starting pollutant concentration in the unpurified air stream. Sampling tube 508 may comprise stainless steel or Teflon, and have smooth inner walls.

After passing first air duct segment 510, unpurified polluted air 506 contacts air cleaner 514. Air cleaner 514 includes a catalyst layer disposed on a substrate, wherein the catalyst layer comprises a base metal catalyst at a first mass percent (such as CPMO) and a rare earth metal at a second mass percent (such as cerium oxide). The catalyst layer may comprise particles, wherein each particle comprises a base metal catalyst and an earth metal catalyst. The catalyst layer is adapted to remove one or more of formaldehyde, ozone, carbon monoxide, nitrous oxide, amines, sulfur compounds, thiols, chlorinated hydrocarbons, or VOCs from unpurified polluted air 506.

Once unpurified polluted air 506 contacts air cleaner 514, purified air enters the second air duct segment 512. Second air duct segment may optionally include an air volume measuring device 522. Air volume measuring device 522 may include a standard orifice plate, a standard nozzle and other throttling devices connected to a micromanometer. The resulting pollutant concentration in purified air flow present in the second air duct segment 512 may be tested through downstream sampling tube 516. Sampling tube 516 may comprise stainless steel or Teflon, and have smooth inner walls. Resulting purified air 524 exits air duct system 500 and is collected for formaldehyde conversion testing.

FIG. 6A depicts a schematic diagram for air purification in accordance with an embodiment of the invention. This schematic illustrates a system test set up configured according to national standard and critical for product performance evaluation.

The system test set up comprises a test chamber 600, a central platform 604, a catalyst device 608 to be tested, unpurified air inlet 606, fan 610 to allow for air circulation, and a unit 602 controlling temperature and humidity.

Unpurified air flow enters chamber 600 through unpurified air inlet 606. The unpurified air stream is drawn into air eddy formed by air circulation resulting from the operation of fan 610. Once the initial pollutant concentration in chamber 600 reaches a predetermined initial value, unpurified air inlet 606 is closed. Fan 610 may continue to operate for a period of time to ensure even distribution of the pollutant in chamber 600. Once even distribution of the pollutant is achieved, fan 610 is turned off. The point at which the fan is turned off is t=0 and the concentration is recorded as $C_0$. For example, the targeted initial concentration of formaldehyde may be about $1.00\pm0.2$ mg/m$^3$. Immediately thereafter the testing begins. Samples are collected every five minutes for a period of an hour to evaluate the cleaning capacity of the catalyst device in terms of Clean Air Delivery Rate (CADR) for gaseous pollutants such as formaldehyde.

The CADR is calculated based on Formula I:

$$CADR = 60 \cdot (k_e - k_n) \cdot V \quad \text{Formula I}$$

wherein $k_e$ represents the total decay constant, $k_n$ represents natural decay constant, V represents the test chamber volume in m$^3$, and $(k_e - k_n)$ is calculated based on Formula II:

$$(k_e - k_n) \cdot t = -\ln(C_t/C_0) \quad \text{Formula II}$$

wherein t represent the total testing time, $C_t$ represents the concentration at time t in mg/m$^3$, and $C_0$ represents the concentration at time t=0 in mg/m$^3$.

FIG. 6B depicts an illustrative control process for air purification in accordance with an embodiment of the invention. The control process may be applied to a similar system test chamber as illustrated in the schematic of FIG. 6A. The method described by this control process is used to test the half life time of a catalyst device according to an embodiment of the invention. "Half life time of a catalyst device" refers to the number of days or hours after which the catalyst device has a CADR that is 50% lower than the initial CADR value produced by the catalyst device at the start of the catalyst device's operation.

According to FIG. 6B the testing begins by obtaining the CADR value produced by the catalyst device at the start of the catalyst device's operation (t=0), also known as $CADR_0$. Subsequently, the catalyst device is optionally subjected to an Acceleration Test. An "Acceleration Test" refers to extreme condition that may impact or deteriorate the efficacy of the catalyst device more rapidly, such as higher pollutant concentration or continuous generation of pollutants. The Acceleration Test results will then allow to estimate the catalyst device's life span under real life conditions.

After the catalyst device is aged for eight hours another sample is taken to obtain the CADR value at t=n, also known as $CADR_n$. If $CADR_n$ value is greater than 50 percent of the $CADR_0$ value, the catalyst device is considered as still operable and the testing continues by repeating the optional acceleration test, aging the catalyst device, and measuring the $CADR_n$ value after each subsequent cycle. Once the $CADR_n$ value is lower or equal to 50 percent of the $CADR_0$ value, the life span of the catalyst device is deemed to have ended and the overall Cumulate Clean Mass (CCM) generated by the catalyst device is calculated.

Figure 6C:
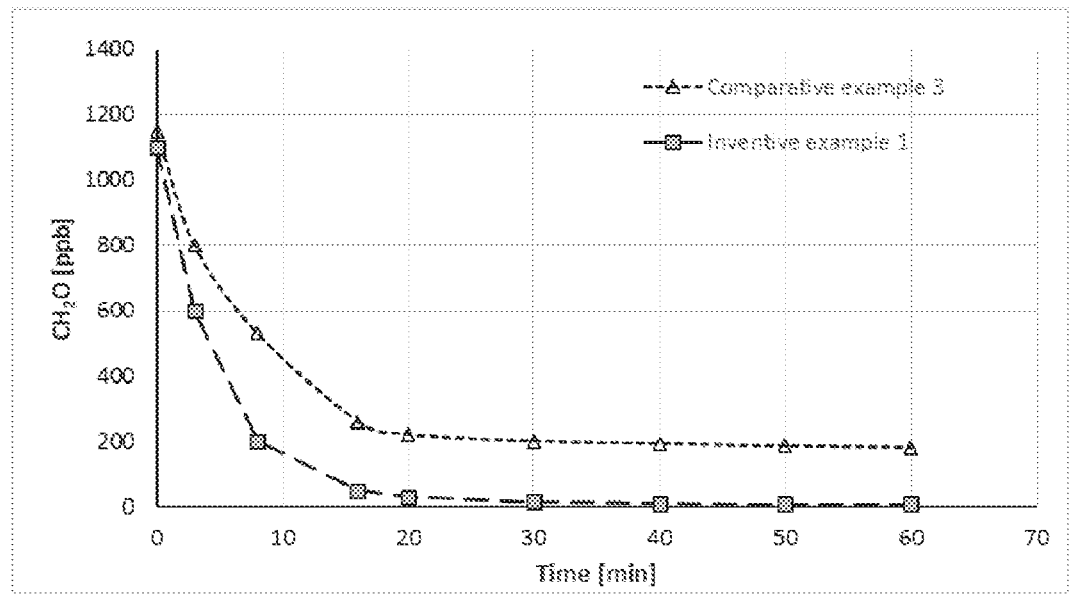
FIG. 6C is a plot depicting formaldehyde filtration efficiency of inventive example 1 and comparative example 3, resulting from a system test performed in accordance with the schematic diagram and process of FIGS. 6A and 6B.

FIG. 6C illustrates a typical curve for CADR calculation based on Formulas I and II as applied to results obtained from a system test, as applied to the catalyst of comparative example 3 and inventive example 1 (described in more detail below), in accordance with the schematic diagram of FIG. 6A. FIG. 6C illustrates the superior performance of inventive example 2. Inventive example 1 reduced the formaldehyde concentration down from about 1100 ppb to 200 ppb in less than 10 minutes. In comparison, comparative example 3 obtained a similar reduction only between about 20 and 30 minutes. Thus, a catalyst according to an embodiment herein is shown to be at least twice as effective, with respect to CADR, than comparative example 3.

EXAMPLES

The following examples are set forth to assist in understanding the embodiments described herein and should not be construed as specifically limiting the embodiments described and claimed herein. Such variations, including the substitution of all equivalents now known or later developed, which would be within the purview of those skilled in the art, and changes in formulation or minor changes in experimental design, are to be considered to fall within the scope of the embodiments incorporated herein.

Inventive Examples

Example 1

73.4 g of Ceria and 73.4 g of Cryptomelane are dispersed in 191 g of water, and a solution of 4.8 g alumina sol (Dispal P3) and 4.8 g acetic acid in 16.8 g water is added to the resulting slurry. A solution of cellulose base thickener (0.2 g) is added to the slurry with vigorous mixing. This slurry is used to coat ceramic monolithic substrates (cordierite; 400 cells per square inch). Afterwards the coated monolith is dried at 120° C. for 2 h and calcined at 250° C. for 1 h. The coating is repeated until the weight gain of the monolithic substrate is 2 g/in$^3$.

Figure 7:
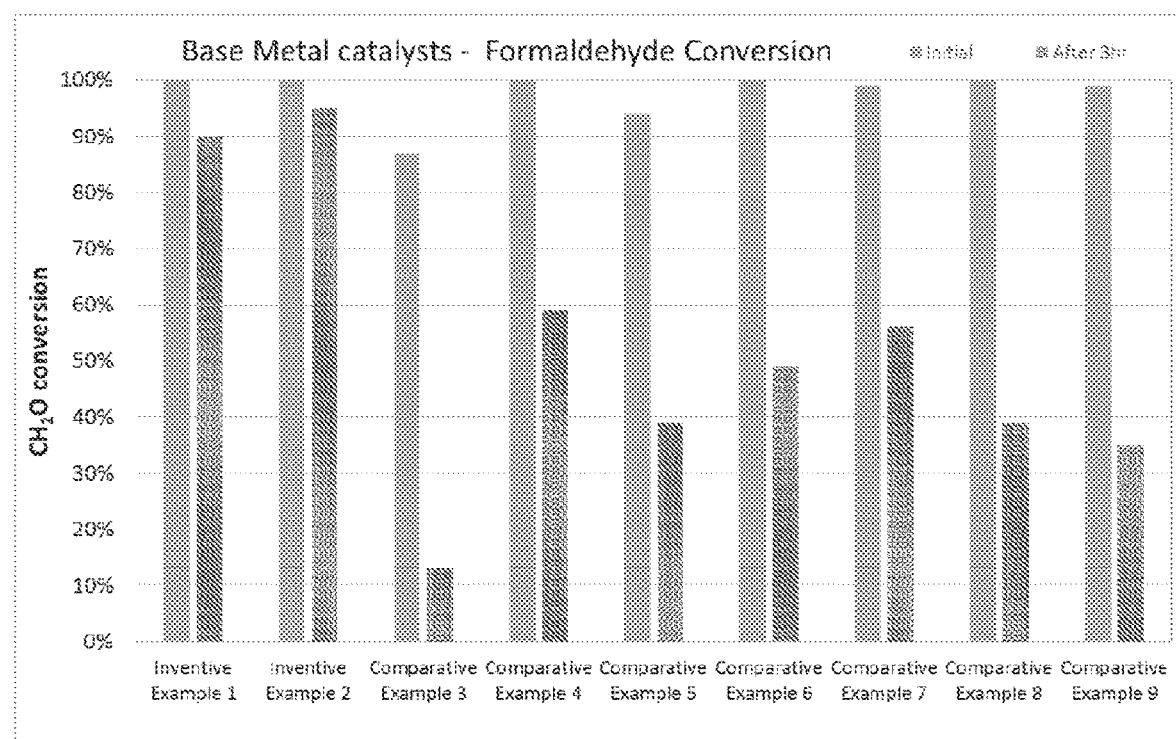
FIG. 7 is a plot depicting formaldehyde conversion for various compositions, described in examples 1-9, over a three hour testing period.

FIG. 7 depicts that the formaldehyde conversion resulting from inventive example 1 initially is 100%, and after three hours the formaldehyde conversion was reduced only by about 10%, resulting in a formaldehyde conversion of about 90%. FIG. 3 depicts an X-ray powder diffraction pattern expressed in terms of °2θ and the intensity counts of the catalyst composition of inventive example 1. The °2θ peaks and intensities are listed in the following table:

| °2θ | Intensity (counts) |
|---|---|
| 13 | 24 |
| 18 | 20 |
| 28.5 | 45 |
| 33 | 20 |
| 37.5 | 17 |
| 42 | 12 |
| 47.5 | 25 |
| 50 | 12 |
| 56 | 20 |
| 59 | 13 |
| 65 | 10 |
| 70 | 12 |
| 76.5 | 13 |
| 79 | 12 |
| 88 | 12 |

Example 2

29.4 g of Ceria and 117.6 g of Cryptomelane are dispersed in 191 g of water, and a solution of 4.8 g alumina sol (Dispal P3) and 4.8 g acetic acid in 16.8 g water is added to the resulting slurry. A solution of cellulose base thickener (0.2 g) is added to the slurry with vigorous mixing. This slurry is used to coat ceramic monolithic substrates (cordierite; 400 cells per square inch). Afterwards the coated monolith is dried at 120° C. for 2 h and calcined at 250° C. for 1 h. The coating is repeated until the weight gain of the monolithic substrate is 2 g/in$^3$.

FIG. 7 depicts that the formaldehyde conversion resulting from inventive example 2 initially is 100%, and after three hours the formaldehyde conversion was reduced only by about 5%, resulting in a formaldehyde conversion of about 95%.

Comparative Examples

Example 3

667.8 g of ceria is dispersed in 909.6 g of water and milled in a continuous mill to a particle size where 90% of the particles are below 10-12 microns. To this slurry 208.3 g of copper acetate monohydrate and 440.8 g of a 47.5% manganese nitrate aqueous solution are added. Separately, a dispersion of 125 g of alumina in 172.6 g of water is milled in a continuous mill to a particle size where 90% of the particles are below 10-12 microns. The alumina dispersion is then added to the dispersion of ceria and base metal salts to form a dispersion mixture. 41.7 g of an alumina sol is then added to the dispersion mixture, which is then mixed until completely homogenous. This slurry is used to coat ceramic monolithic substrates (cordierite; 400 cells per square inch). Afterwards the coated monolith is dried at 120° C. for 1 h and calcined at 500° C. for 2 h. The coating is repeated until the weight gain of the monolithic substrate is 2.75 g/in$^3$.

FIG. 7 depicts that the formaldehyde conversion resulting from comparative example 3 initially is less than 90%, and after three hours the formaldehyde conversion was reduced significantly by more than about 75%, resulting in a formaldehyde conversion of merely about 15%.

Example 4

117.6 g of Ceria and 29.4 g of Cryptomelane are dispersed in 191 g of water, and a solution of 4.8 g alumina sol (Dispal P3) and 4.8 g acetic acid in 16.8 g water is added to the resulting slurry. A solution of cellulose base thickener (0.2 g) is added to the slurry with vigorous mixing. This slurry is used to coat ceramic monolithic substrates (cordierite; 400 cells per square inch). Afterwards the coated monolith is dried at 120° C. for 2 h and calcined at 250° C. for 1 h. The coating is repeated until the weight gain of the monolithic substrate is 2 g/in$^3$.

FIG. 7 depicts that the formaldehyde conversion resulting from comparative example 4 initially is 100%, and after three hours the formaldehyde conversion was reduced significantly by more than about 40%, resulting in a formaldehyde conversion of less than about 60%. This comparative example illustrates that a catalyst layer or a catalyst particle comprising ceria in an amount that is greater than the amount of cryptomelane has inferior long term performance (e.g., shorter life span), with respect to formaldehyde conversion, as compared to a catalyst layer or a catalyst particle comprising ceria in an amount that is equal to or lower than the amount of cryptomelane.

Example 5

144 g Cryptomelane and 2.93 g Cerium(III)nitrate is dispersed in 184 g of water, and a solution of 4.8 g alumina sol (Dispal P3) and 4.8 g acetic acid in 16.8 g water is added to the resulting slurry. A solution of cellulose base thickener (0.2 g) is added to the slurry with vigorous mixing. This slurry is used to coat ceramic monolithic substrates (cordierite; 400 cells per square inch). Afterwards the coated monolith is dried at 120° C. for 2 h and calcined at 250° C. for 1 h. The coating is repeated until the weight gain of the monolithic substrate is 2 g/in$^3$.

FIG. 7 depicts that the formaldehyde conversion resulting from comparative example 5 initially is about 95%, and after three hours the formaldehyde conversion was reduced significantly by more than about 50%, resulting in a formaldehyde conversion of less than about 40%.

Example 6

132 g Cryptomelane and 14.7 g Cerium(III)nitrate is dispersed in 155 g of water, and a solution of 4.8 g alumina sol (Dispal P3) and 4.8 g acetic acid in 16.8 g water is added to the resulting slurry. A solution of cellulose base thickener (0.2 g) is added to the slurry with vigorous mixing. This slurry is used to coat ceramic monolithic substrates (cordierite; 400 cells per square inch). Afterwards the coated monolith is dried at 120° C. for 2 h and calcined at 250° C. for 1 h. The coating is repeated until the weight gain of the monolithic substrate is 2 g/in$^3$.

FIG. 7 depicts that the formaldehyde conversion resulting from comparative example 6 initially is 100%, and after three hours the formaldehyde conversion was reduced significantly by more than about 50%, resulting in a formaldehyde conversion of less than about 50%.

Example 7

117.5 g Cryptomelane and 29.4 g Cerium(III)nitrate is dispersed in 119 g of water, and a solution of 4.8 g alumina sol (Dispal P3) and 4.8 g acetic acid in 16.8 g water is added to the resulting slurry. A solution of cellulose base thickener (0.2 g) is added to the slurry with vigorous mixing. This slurry is used to coat ceramic monolithic substrates (cordierite; 400 cells per square inch). Afterwards the coated monolith is dried at 120° C. for 2 h and calcined at 250° C. for 1 h. The coating is repeated until the weight gain of the monolithic substrate is 2 g/in$^3$.

FIG. 7 depicts that the formaldehyde conversion resulting from comparative example 7 initially is about 99%, and after three hours the formaldehyde conversion was reduced significantly by more than about 40%, resulting in a formaldehyde conversion of less than about 60%.

Comparative examples 5-7 illustrate that a catalyst layer or catalyst particle comprising cerium(III)nitrate has inferior short and long term performance, with respect to formaldehyde conversion, as compared to a catalyst layer or a catalyst particle comprising ceria. The formaldehyde conversion increases as the amount of cerium(III)nitrate in the catalyst layer or catalyst particle increases. However, even when the weight percent of cerium(II)nitrate in the catalyst layer or catalyst particle is equal to the weight percent of ceria in the inventive examples (e.g., inventive example 2 and comparative example 7), the catalyst layer or catalyst particle of example 7 has inferior formaldehyde conversion as compared to that of inventive example 2. This illustrates that the superior performance of inventive example 2 may be partially due to the presence of ceria in the catalyst layer or catalyst particle composition.

Example 8

146.8 g Cryptomelane is dispersed in 191 g of water, and a solution of 4.8 g alumina sol (Dispal P3) and 4.8 g acetic acid in 16.8 g water is added to the resulting slurry. A solution of cellulose base thickener (0.2 g) is added to the slurry with vigorous mixing. This slurry is used to coat ceramic monolithic substrates (cordierite; 400 cells per square inch). Afterwards the coated monolith is dried at 120° C. for 2 h and calcined at 250° C. for 1 h. The coating is repeated until the weight gain of the monolithic substrate is 2 g/in$^3$.

FIG. 7 depicts that the formaldehyde conversion resulting from comparative example 8 initially is 100%, and after three hours the formaldehyde conversion was reduced significantly by more than about 50%, resulting in a formaldehyde conversion of less than about 40%. This comparative example illustrates that a catalyst layer or a catalyst particle comprising cryptomelane only has inferior long term performance (e.g., shorter life span), with respect to formaldehyde conversion, as compared to a catalyst layer or a catalyst particle comprising both ceria and cryptomelane.

Example 9

146.8 g Ceria is dispersed in 191 g of water, and a solution of 4.8 g alumina sol (Dispal P3) and 4.3 g acetic acid in 16.8 g water is added to the resulting slurry. A solution of cellulose base thickener (0.2 g) is added to the slurry with vigorous mixing. This slurry is used to coat ceramic monolithic substrates (cordierite; 400 cells per square inch). Afterwards the coated monolith is dried at 120° C. for 2 h and calcined at 500° C. for 2 h. The coating is repeated until the weight gain of the monolithic substrate is 2 g/in$^3$.

FIG. 7 depicts that the formaldehyde conversion resulting from comparative example 9 initially is about 99%, and after three hours the formaldehyde conversion was reduced significantly by more than about 60%, resulting in a formaldehyde conversion of less than about 40%. This comparative example illustrates that a catalyst layer or a catalyst particle comprising ceria only has inferior short and long term performance (e.g., shorter life span), with respect to formaldehyde conversion, as compared to a catalyst layer or a catalyst particle comprising both ceria and cryptomelane.

FIG. 7 is a plot depicting formaldehyde conversion for various compositions. The plot shows a formaldehyde conversion comparison of catalyst compositions prepared according to the examples listed above. The tests were performed at a temperature of about 35° C., at a moisture content of about 1%, with a starting formaldehyde concentration of about 2 ppm formaldehyde in air, and at a flow stream Volume Hourly Space Velocity (VHSV) of about 50,000 h$^{-1}$.

FIG. 7 illustrates the formaldehyde conversion of each of the catalysts tested at t=0 (also the referred to as the "initial" conversion) and the formaldehyde conversion of each of the catalysts tested at t=3 hours (also referred to as the "Test End" conversion).

At each testing time point, t=0 and t=3 hours, respectively, the inventive examples disclosed herein appear to outperform all other comparative example catalysts. Not only is catalyst according to an embodiment disclosed herein superb in its formaldehyde conversion, it also superbly maintains its performance and efficacy over time.

Example 10

Figure 8A:
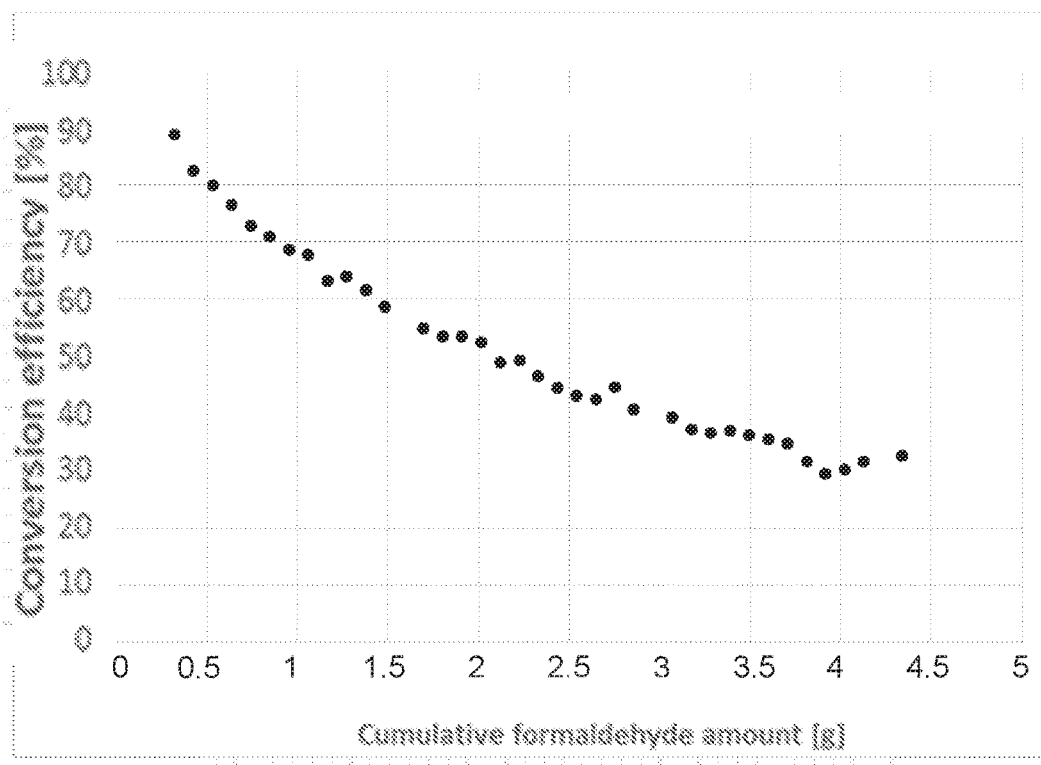
FIG. 8A is a plot depicting typical filtration efficiency resulting from a one pass test performed in accordance with the schematic diagram of FIG. 5 of a commercial catalyst.

FIG. 8A is a plot depicting filtration efficiency from a one pass test performed in accordance with the schematic diagram of FIG. 5 illustrating the formaldehyde filtration efficiency as a function of cumulate formaldehyde clean amount resulting from a commercial product.

FIG. 8A illustrate that a commercial product's formaldehyde filtration efficiency reduces by 50 percent in a one-pass test from a filtration efficiency of about 90% down to a filtration efficiency of about 30%.

Example 11

Figure 8B:
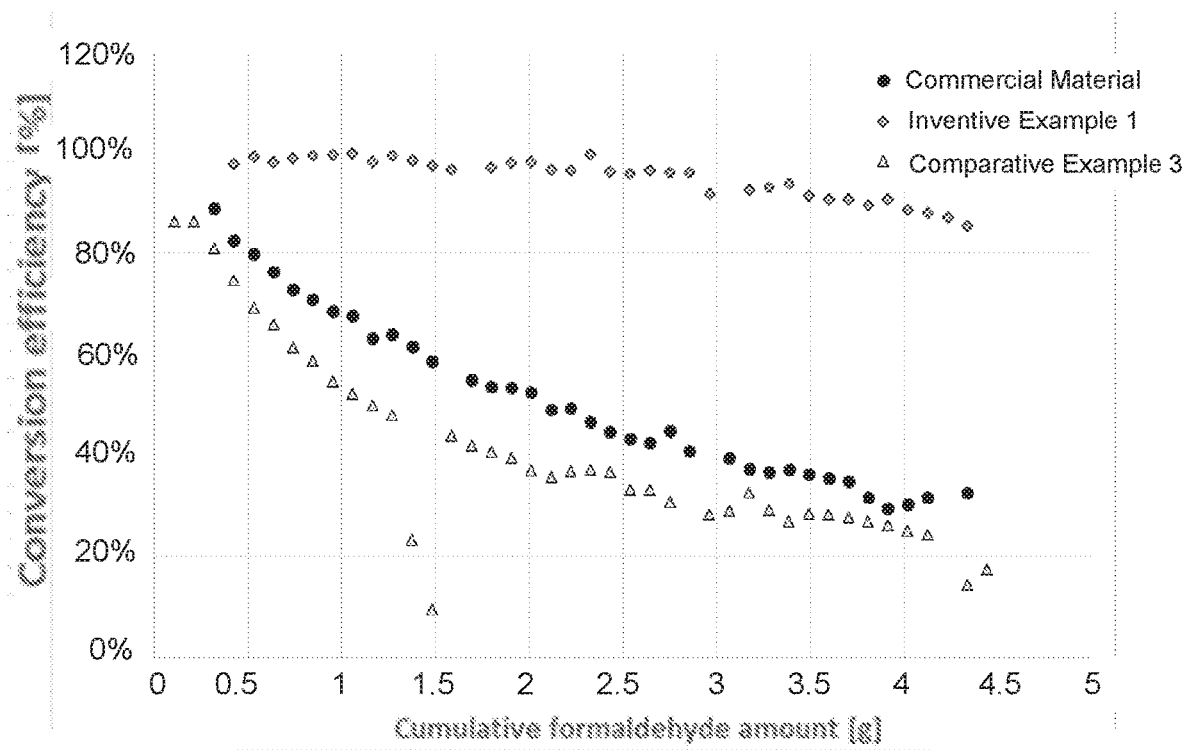
FIG. 8B is a plot depicting formaldehyde conversion efficiency resulting from a one pass test performed in accordance with the schematic diagram of FIG. 5 of a catalyst device prepared in inventive example 1 and comparative example 3.

FIG. 8B is a plot depicting a catalyst lifetime test performed in accordance with the schematic diagram of FIG. 5 illustrating the formaldehyde conversion efficiency as a function of cumulate formaldehyde amount cleaned by the catalyst device according to an embodiment.

FIG. 8B illustrates that catalyst devices according to embodiments disclosed herein, specifically that described in inventive example 1, results in superior performance as compared to the commercial product and as to the catalyst described in comparative example 3. The catalyst device of inventive example 1 starts with a greater formaldehyde conversion efficiency of about 98%-100% and reduces only to about 85%. In comparison, the catalyst device of comparative example 3 has a shorter lifetime illustrated by its formaldehyde conversion efficiency which reduces rapidly from about 85% down to about 20%. Similarly, the commercial product also has a shorter lifetime than the lifetime of the catalyst of inventive example 1. The commercial product's formaldehyde conversion efficiency reduces from about 90% to about 35%. All filtration efficiency measurements were compared up to the same cumulate formaldehyde amount of about 4.5 g. Thus, inventive example 1 is superior to comparative example 3 and the commercial product in several aspects, including but not limited to, formaldehyde conversion efficiency of a fresh as well as an aged catalyst device, catalyst lifetime, and the overall cumulate amount of formaldehyde removed.

The use of the terms "a," "an," "the," and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one implementation," "certain implementations," "one or more implementations" or "an implementation" means that a particular feature, structure, material, or characteristic described in connection with the implementation is included in at least one implementation of the present disclosure. Thus, the appearances of the phrases such as "in one or more implementations," "in certain implementations," "in one implementation," or "in an implementation" in various places throughout this specification are not necessarily referring to the same implementation of the present disclosure. Furthermore, the particular features, structures, materials, or characteristics may be combined in any suitable manner in one or more implementations.

Although the implementations disclosed herein have been described with reference to particular implementations, it is to be understood that these implementations are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents, and the above-described implementations are presented for purposes of illustration and not of limitation.

What is claimed is:

1. A catalyst device for purifying an air supply of formaldehyde and volatile organic compounds, the catalyst device comprising:
    a housing; and
    a catalyst layer disposed on a surface in the housing, wherein the catalyst layer comprises:
        a base metal catalyst at a first mass percent from about 30% to about 80%, wherein the base metal catalyst comprises cryptomelane catalyst particles;
        a rare earth metal catalyst at a second mass percent from about 70% to about 20%, wherein the rare earth metal catalyst comprises cerium oxide catalyst particles, and wherein the first and second mass percents are with respect to a total weight of the catalyst, and
        a binder material;
    wherein the cryptomelane catalyst particles and the cerium oxide catalyst particles are physically mixed within the catalyst layer.

2. The catalyst device of claim 1, wherein the catalyst layer is to remove one or more of formaldehyde, ozone, carbon monoxide, nitrous oxide, amines, sulfur compounds, thiols, chlorinated hydrocarbons, or volatile organic compounds from an unpurified air supply.

3. The catalyst device of claim 1, further comprising a solid substrate within the housing, wherein the catalyst layer is disposed on the solid substrate.

4. The catalyst device of claim 3, wherein the solid substrate is a nonwoven filter, a paper filter, a ceramic filter, a fibrous filter, a metallic foam substrate, a ceramic foam substrate, a polymer foam substrate, a metallic monolithic substrate, a ceramic monolithic substrate, a polymer monolithic substrate, a paper monolithic substrate, a ceramic fiber monolithic substrate, an HVAC duct, an air filter, or a louver surface.

5. The catalyst device of claim 1, further comprising:
    an inlet port configured to receive unpurified air into an interior of the housing; and
    an outlet port configured to deliver purified air from the housing.

6. The catalyst device of claim 5, wherein the catalyst device is configured to contact the unpurified air with the catalyst.

7. The catalyst device of claim 6, wherein formaldehyde present in the unpurified air is removed upon contact with the catalyst layer.

8. The catalyst device of claim 7, wherein the unpurified air has an initial formaldehyde content, and the purified air has a final formaldehyde content that is less than the initial formaldehyde content.

9. The catalyst device of claim 8, wherein the final formaldehyde content of the purified air is less than about 50% of the initial formaldehyde content of the unpurified air.

10. The catalyst device of claim 5, wherein the catalyst device is incorporated into a heating, ventilation, and air conditioning (HVAC) system.

11. The catalyst device of claim 5, wherein the catalyst device is incorporated into a portable air purifier.

12. The catalyst device of claim 1, wherein the catalyst layer exhibits an XRD pattern characterized by the following °2Θ peaks and intensities:

| °2Θ | Intensity (counts) |
| --- | --- |
| 13 | 24 |
| 18 | 20 |
| 28.5 | 45 |

-continued

| °2θ | Intensity (counts) |
|---|---|
| 33 | 20 |
| 37.5 | 17 |
| 42 | 12 |
| 47.5 | 25 |
| 50 | 12 |
| 56 | 20 |
| 59 | 13 |
| 65 | 10 |
| 70 | 12 |
| 76.5 | 13 |
| 79 | 12 |
| 88 | 12. |

* * * * *